United States Patent [19]

Casey et al.

[11] Patent Number: 5,164,008
[45] Date of Patent: Nov. 17, 1992

[54] IMMOBILIZATION OF INCINERATOR ASH TOXIC ELEMENTS IN AN ENVIRONMENTALLY SAFE SOIL CEMENT COMPOSITION AND METHOD OF MANUFACTURE

[75] Inventors: William W. Casey, Wimauma; Clarence E. Leisey, III, Apollo Beach; Eric W. Shafer, Sarasota; Francis I. Daniels, Clearwater, all of Fla.

[73] Assignee: Permabase, Inc., Sun City, Fla.

[21] Appl. No.: 642,074

[22] Filed: Jan. 16, 1991

Related U.S. Application Data

[62] Division of Ser. No. 447,398, Dec. 7, 1989, Pat. No. 5,061,318.

[51] Int. Cl.$^5$ .............................................. C04B 7/26
[52] U.S. Cl. .................................. 106/756; 106/751; 106/758; 106/763
[58] Field of Search ............... 106/751, 756, 757, 758, 106/763

[56] References Cited

U.S. PATENT DOCUMENTS

| | | | |
|---|---|---|---|
| 3,293,999 | 12/1966 | Gnaedinger | 94/7 |
| 3,328,180 | 6/1967 | Ban | 106/74 |
| 4,210,457 | 7/1980 | Dodson et al. | 106/97 |
| 4,336,069 | 6/1982 | Dodson et al. | 106/97 |
| 4,375,896 | 3/1983 | Pichat | 106/85 |
| 4,496,267 | 1/1985 | Gnaedinger | 404/82 |
| 4,629,509 | 12/1986 | O'Hara et al. | 106/118 |
| 4,737,356 | 4/1988 | O'Hara et al. | 423/659 |
| 4,744,829 | 5/1988 | Eirich et al. | 106/97 |
| 4,804,147 | 2/1989 | Hooper | 241/24 |

Primary Examiner—Mark L. Bell
Assistant Examiner—Chris Gallo
Attorney, Agent, or Firm—Mason, Fenwick & Lawrence

[57] ABSTRACT

A composition, suitable for use as a base in the construction of roads, parking lots, and other areas, is formulated from an ash aggregate comprising municipal solid waste incinerator ash, MSWIA, mixed with an aggregate material; upon addition of cement, compaction and curing, a volumetrically stable solid is formed. The incinerator ash is combined with an aggregate material, crushed, and sifted to remove particles having a size greater than three eights ($\frac{3}{8}$") inch prior to the addition of cement. The moisture content of the ash aggregate mixture and ash aggregate/cement mixtures are carefully adjusted to achieve maximum compressive strength. When ash aggregates containing less than 50 percent MSWIA are combined with at least 5 percent cement by dry weight, volumetrically stable solids are formed within seven days that have compressive strengths in excess of 300 psi. The stable solids immobilize heavy metals in the MSWIA so that leachates from EPA toxicity tests have concentrations of arsenic, barium, chromium, cadmium, lead, mercury, silver and selenium less than the EPA maximum allowable concentrations for materials to be classified as non-hazardous. A process and apparatus is also described for producing the compositions.

12 Claims, 16 Drawing Sheets

| LINE | ASH CONTENT (MSWIA) |
|---|---|
| 1 | 0.0% |
| 2 | 25.0% |
| 3 | 50.0% |
| 4 | 75.0% |
| 5 | 100.0% |

ASH AGGREGATE: 25% MSWIA, 75% SAND/SHELL
CEMENT: 2% BY DRY WEIGHT

MOISTURE CONTENT VS. DENSITY (AASHTO T-99)

ASH AGGREGATE: 25% MSWIA, 75% SAND/SHELL
CEMENT: 8% BY DRY WEIGHT

MOISTURE CONTENT VS. DENSITY (AASHTO T-99)

ASH AGGREGATE: 50% MSWIA, 50% SAND/SHELL
CEMENT: 2% BY DRY WEIGHT

ASH AGGREGATE: 50% MSWIA, 50% SAND/SHELL
CEMENT: 4% BY DRY WEIGHT

ASH AGGREGATE: 50% MSWIA, 50% SAND/SHELL
CEMENT: 6% BY DRY WEIGHT

ASH AGGREGATE: 75% MSWIA, 25% SAND/SHELL
CEMENT: 6% BY DRY WEIGHT

ASH AGGREGATE: 75% MSWIA, 25% SAND/SHELL
CEMENT: 8% BY DRY WEIGHT

100% MSWIA AND 4% CEMENT BY DRY WEIGHT

100% MSWIA AND 6% CEMENT BY DRY WEIGHT

100% MSWIA AND 8% CEMENT BY DRY WEIGHT

ASH AGGREGATE: 25% MSWIA, 75% SAND/SHELL
CEMENT: 2% BY DRY WEIGHT

MOISTURE CONTENT VS. UNCONFINED COMPRESSIVE STRENGTH

ASH AGGREGATE: 25% MSWIA, 75% SAND/SHELL
CEMENT: 8% BY DRY WEIGHT

MOISTURE CONTENT VS. UNCONFINED COMPRESSIVE STRENGTH

ASH AGGREGATE: 50% MSWIA, 50% SAND/SHELL
CEMENT: 2% BY DRY WEIGHT

100% MSWIA AND 4% CEMENT BY DRY WEIGHT

100% MSWIA AND 6% CEMENT BY DRY WEIGHT

IMMOBILIZATION OF INCINERATOR ASH TOXIC ELEMENTS IN AN ENVIRONMENTALLY SAFE SOIL CEMENT COMPOSITION AND METHOD OF MANUFACTURE

This application is a divisional application of U.S. patent application Ser. No. 447,398, filed Dec. 7, 1989, now U.S. Pat. No. 5,061,318.

FIELD OF THE INVENTION

The present invention relates to road base compositions in general, and relates more particularly to high compressive strength soil cement compositions, suitable as base material for the construction of roads, which contain municipal solid waste incinerator ash and immobilize toxic elements therein so that they do not leach into the environment.

BACKGROUND OF THE INVENTION

Generally, roads, parking lots, or other areas that must carry heavy traffic comprise three elements: a subgrade, a base and a surface course. The surface course is in direct contact with the traffic, and the base transmits pressure exerted by vehicles on the surface course to the subgrade. Depending on strength requirements, different materials can be used to form the base; for example, granular materials such as crushed stone, sand, shell and other silicious or calcarious solids can be used.

Some high grade aggregate materials, when compacted correctly, form a road base with sufficient compressive strength so as not to require the addition of cement; these high grade aggregate materials are not always readily available, and are frequently more expensive than low grade aggregate materials mixed with cement. Since cement is substantially more expensive than either high or low grade aggregate materials, it is desirable to add as small a percentage of cement to an aggregate material as is necessary to achieve the required compressive strength. However, in areas where high grade aggregate materials are not available, and the only available aggregate materials are low grade aggregate materials that require large amounts of cement to form solids having sufficient compressive strength, road base construction is more expensive.

Due to the large volume and variety of materials processed by large municipal solid waste incineration facilities, the wastes are frequently not completely combusted, and the ash, particularly the fly ash, often contains dangerous concentrations of toxic elements such as cadmium and lead. To prevent continued combustion outside of the incinerator, water is sprayed on the burning wastes leaving the combustion zone; usually, large chunks of metal and uncombusted material remain in this wet bottom ash. Many facilities also combine the fly ash, which may contain toxic concentrations of heavy metals, with the wet bottom ash. The safe disposal of the wet, partially incinerated, and/or potentially toxic incinerator ash poses an expensive disposal problem for municipal solid waste incinerator facilities.

Coal fly ash is pozzolanic; a cementitious solid is formed by mixing coal fly ash with lime. For this reason, coal fly ash and lime have been used in place of cement, or in addition to cement, for road and building construction; coal fly ash is also known to increase the strength of concrete to which it is added to, and structures built using coal fly ash pose little danger to the environment as coal fly ash generally does not contain dangerous levels of toxic elements If ash produced by municipal solid waste incinerator facilities could be used in a similar fashion to coal fly ash, a major environmental disposal problem could be solved, while simultaneously providing an inexpensive source of material that can be used in constructing roads and other structures.

PRIOR ART

O'Hara et al., U.S. Pat. No. 4,737,356, discloses the immobilization of lead and cadmium in dry solid residues from combusted refuse by mixing in lime and a water soluble phosphate to form a particulate, non-hardened solid that is disposed of in land fills; the particulate prevents leaching of cadmium and lead over a wide pH range. However, O'Hara teaches that incinerator fly ash is not pozzolanic, cannot form a stable, hardened solid (i.e., similar to concrete) in the absence of ordinary portland cement, and that methods applicable to agglomeration of coal fly ashes are simply not applicable to incinerator fly ashes.

Gnaedinger, in U.S. Pat. No. 4,496,267 and U.S. Pat. No. 3,293,999, discloses a method for forming a stable solid, suitable for use as a road base, from incinerator ash mixed with lime, or a lime and coal fly ash mixture; Gnaedinger requires that the incinerator ash be prepared in a slowly rotating kiln-type furnace, or uses ash that is burnt thoroughly from an incinerator that is "properly operated." The incinerator ash serves both as aggregate and as the chemical material that reacts with the lime. The most important characteristic of Gnaedinger's incinerator ash is the carbon content; a typical incinerator ash has an approximately 15% organic content as measured by loss on ignition. When the incinerator ash is combined with the lime, a carbonation reaction occurs that causes a stable solid to form over time. The process involves passing the incinerator ash through a three quarter inch to one inch ($\frac{3}{4}''$ to $1''$) screen, and pretreating the uncompacted incinerator ash for several days with two to ten percent (2 to 10%) by weight of lime or a lime and coal fly ash mix: after several days, a binding mixture of two to ten percent (2 to 10%) by weight of additional lime is added; after moisture is adjusted to approximate the optimum moisture level as determined by ASTM Method D-1557-58T, the material is then compressed into a road base. Gas evolves for about three days after the road base has been formed. The material will not achieve its full strength until at least one month has passed.

Nevertheless, the Gnaedinger process cannot be used with randomly non-uniform mixtures of fly ash and bottom ash having variable carbon contents typical of municipal solid waste incineration facilities, and it is uncertain whether use of municipal solid waste incinerator ash with the process would prevent the leaching of toxic materials into the environment. Furthermore, certain states, such as Florida, require that total organics not exceed three percent (3%) in a road base material, which is considerably lower than the carbon content of road bases produced using the Gnaedinger process, and the road bases produced by the Gnaedinger process require considerably longer to achieve compressive strengths usually required of other road base materials after a seven day cure time.

There remains a need for an inexpensive material that is suitable as a base for roads, parking lots, or other surfaces that utilizes small amounts of cement and/or aggregate material. There is also a need for an inexpensive and environmentally safe way to dispose of municipal solid waste incinerator ash that avoids dumping in landfills and the environmental leaching of toxic metals such as cadmium and lead.

Therefore, it is a primary object of this invention to provide a composition containing incinerator ash and suitable as a base for surfaces such as roads and parking lots that is less expensive to produce than bases formed only from high grade aggregate material or mixtures of low grade aggregate material and cement;

It is a further object of this invention to provide a composition containing incinerator ash and suitable as a base for surfaces such as roads and parking lots that has a higher compressive strength than bases formed from only low grade aggregate material and cement;

It is a still further object of this invention to provide a process for using incinerator ash to produce an inexpensive composition that has high strength and is suitable for use as a base for roads, parking lots and other structures;

It is yet another object of the present invention to provide an apparatus for producing compositions containing incinerator ash that are suitable for use as a base for roads, parking lots and other structures; and It is a further object of this invention to dispose of municipal solid waste incinerator ash in an inexpensive manner that reduces the potential for leaching of toxic metals into the environment.

SUMMARY OF THE INVENTION

These and other objects of the invention are achieved in a preferred embodiment by the combination of between 25 and 50 percent municipal solid waste incinerator ash with a low or high grade aggregate material such as sand, gravel, crushed stone, silicious solids, shell, granite, mixed sand and shell, limerock screenings, limerock tailings, and calcarious solids.

The ash aggregate mixture is sifted to ensure that all particles are less than $\frac{3}{8}''$ and preferably pass through an ASTM #4 mesh screen. Ferrous metals are also magnetically removed, and particles larger than $\frac{3}{8}''$ are crushed and resifted. The resulting ash aggregate mixture, having a particle size less than $\frac{3}{8}''$ and a moisture content ranging from one to thirteen percent (1 to 13%) is then mixed with a cement, such as portland cement, to form the composition of the present invention.

In a preferred embodiment, the cement and the ash aggregate combination has a moisture content adjusted to range between eight and twelve percent (8 to 12%) and contains between one percent and nine percent (1 to 9%) cement by dry weight. Another preferred embodiment of the composition generally comprises at least five percent (5%) cement by dry weight, and has a seven day unconfined compressive strength greater than a non-ash containing only the same aggregate material mixed with an equivalent amount of cement.

Extrapolating from a preferred embodiment, substantial immobilization of heavy metals would obviously occur when lesser quantities of municipal solid waste incinerator ash, such as 1% or 10%, are combined with an aggregate material using the process of the invention, although strength enhancement effects may be so minimal in compositions containing 1% ash as to be undetectable. When at least 5% cement is present, the toxic metals are substantially immobilized in all of the stable solids formed from soil cement compositions containing MSWIA, but soil cement compositions using ash aggregates having more than 75% MSWIA do not always form stable hardened solids.

The composition is formed in a processing plant that initially sifts out particles having a size greater than two inches (2") from the aggregate material and the incinerator ash; ferrous metals are removed from the incinerator ash by magnetic attraction. Input belts, leading to a first mixing chamber, have scales connected to an integrator that controls the amount of ash mixed with aggregate material. In a preferred embodiment, the ash aggregate mixture is then screened to remove particles having a size too great to pass through an ASTM #4 mesh screen. Particles too large to pass through an ASTM #4 mesh screen are crushed and rescreened; particles that are still too large to pass through an ASTM No. 4 mesh screen are disposed of or sent to recycling. Ash aggregate having a particle size sufficiently small to pass through an ASTM #4 mesh screen is then mixed in a second chamber with cement, and water is added if necessary, to form the composition. An integrator also automatically controls the input of aggregate material and cement into the second chamber and measures the amount of material combined through the use of scales on the input belts to the second mixing chamber.

Other objects and advantages of the subject invention will become apparent from the accompanying drawings and detailed description in which like reference numerals are used for the same parts as illustrated in the various Figures.

DETAILED DESCRIPTION OF THE INVENTION

Figure 1:
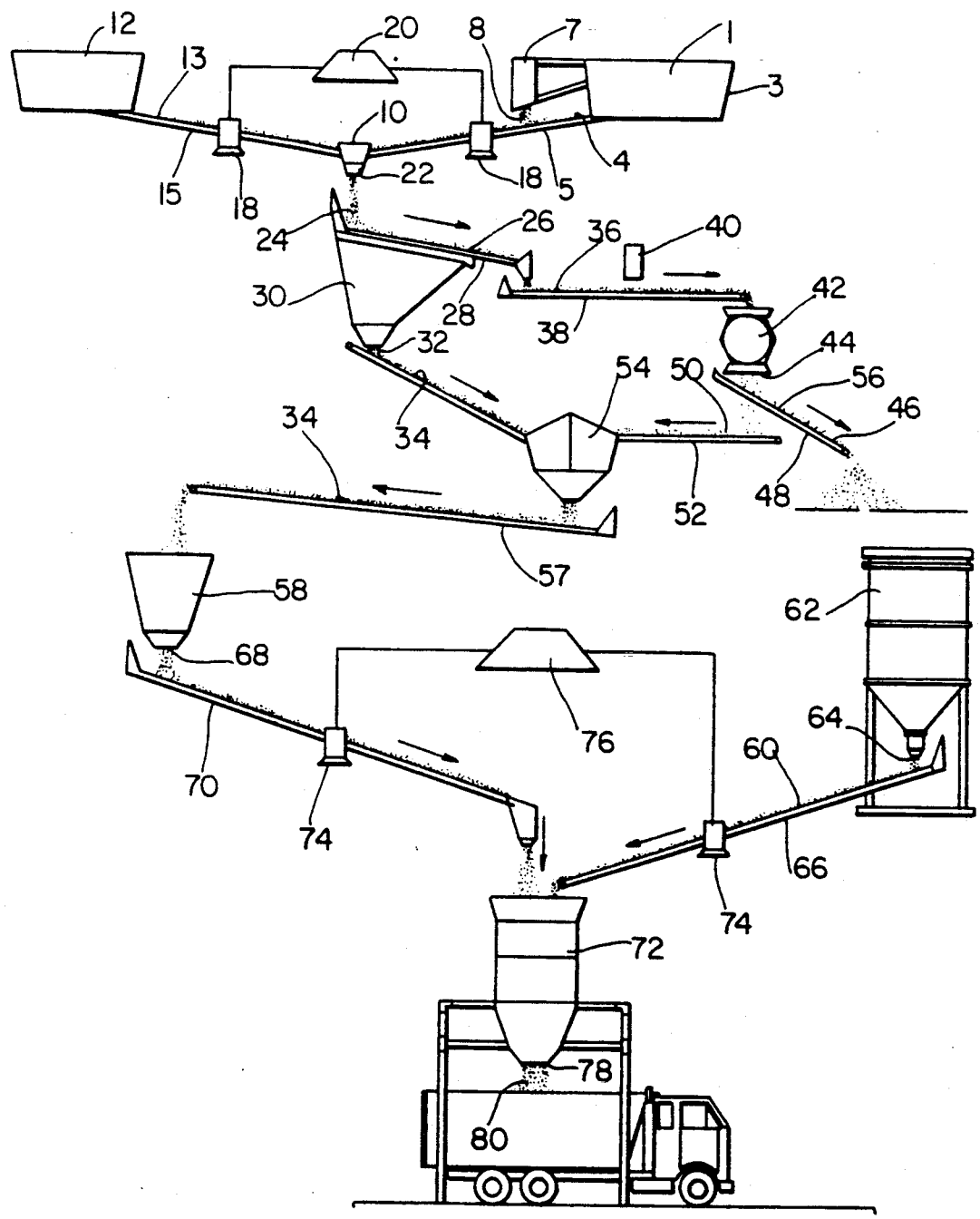
FIG. 1 illustrates a plant layout for the manufacture of a composition suitable as a base for surfaces such as roads and parking lots made from cement and an aggregate material that contains municipal solid waste incinerator ash.

Many roads, parking lots and other surfaced areas are constructed with a base layer between the subgrade and the surface layer. This road base can be formed from naturally occurring high grade road base materials, such as lime rock or bank run shell, which generally do not require the addition of cement to achieve sufficient compressive strength. For example, Florida requires that naturally occurring high grade road base materials, or "in situ" road base materials, exceed an 800 pound per square inch confined compressive strength test in order to be used in road construction. Confined compressive strength is determined by the resistance to penetration of a "pill" confined in a mold.

Naturally occurring high grade road base materials tend to be expensive, and less expensive substitutes are often used. A common substitute, known as soil cement, is made from a low grade aggregate material mixed with cement; the amount of cement added depends upon the compressive strength requirements of the road base being constructed and the nature of the aggregate material being used. Soil cement road base materials can be of the "mixed-in-place type" or mixed in a pug mill at a remote plant and transported to the job site.

Mixed-in-place soil cement, as its name indicates, is spread upon a road subgrade and mixed at the job site. This requires additional job site equipment, does not provide very good quality control, and causes a great deal of dust to be thrown into the air. As a result, pug mill soil cement, or soil cement, is preferred since the aggregate material and cement are mixed at a separate plant site where quantities can be carefully measured, and mixing processes can be controlled to ensure a consistent product; once transported to a job site, soil cement is spread and compressed to form a road base. For example, a superior soil cement is produced by Leisey Shell Corporation of Ruskin, Florida, and sold under the trade name PERMABASE. PERMABASE soil cement is formed from a aggregate material comprised of sand and shell that is mixed with between five and nine percent portland cement by dry weight. The correct amount of portland cement is added and the moisture content adjusted at the plant site to ensure uniformity and sufficient compressive strength.

Many states have set minimum compressive strength requirements for soil cement compositions; for example, the State of Florida requires that soil cement used for road bases have a seven day unconfined compressive strength of 300 psi. Unconfined compressive strength is measured by removing soil cement pills from the mold they were cured in, and subjecting the pills to a crushing force until they fail and break.

Cement, such as portland cement, is generally much more expensive than either naturally occurring road base materials or suitable soil cement aggregate materials. Therefore, it may be less expensive in some cases to use a naturally occurring high grade road base material rather than a low grade soil cement aggregate material that requires a large amount of cement to achieve sufficient compressive strength. Since it is well known to add coal fly ash to cement to increase the compressive strength of concrete structures and roads, we sought to form an improved soil cement composition that utilizes municipal solid waste incinerator ash, MSWIA, as a partial substitute for soil cement low grade aggregate material and cement.

EARLY EXPERIMENTS

Various quantities of municipal solid waste incinerator ash, MSWIA, were combined with portland cement; and allowed to cure for at least seven days. When 100 percent raw MSWIA was mixed with two, four, six or eight percent portland cement, inconsistent results were achieved; many samples did not solidify sufficiently after seven days to form a "pill" for compressive strength tests. These pills can be formed according to ASTM Standard Method D 1632-63, by Florida Method of Test 5520 or any other method capable of forming a pill suitable for compressive strength testing.

When less than 100% of raw MSWIA was mixed with an aggregate material, such as sand and shell, and portland cement, unconfined compressive strengths in excess of 300 psi were achieved after seven (7) days. For example, soil cement samples containing 25%, 50% and 75% raw MSWIA combined with a sand/shell aggregate and mixed with 5% portland cement formed solid pills which had unconfined compressive strengths in excess of 300 psi after seven days.

However, after thirty (30) days, approximately half of the samples began to blister and fall apart, with many pills expanding considerably in size. This may be due to the formation of salt crystals or another slow kinetic reaction Therefore, in order to form a volumetrically stable, solid soil cement composition containing MSWIA, suitable for use as a base for roads, parking lots and other areas, which would not blister or rapidly decay, it was necessary to develop a new process and/or composition.

ENVIRONMENTAL CONSIDERATIONS

Since soil cement in a road base is often exposed to water, it is possible for soluble metals to leach out and contaminate the environment. A wide variety of materials enter municipal solid waste incinerator facilities: these materials may include tires, car batteries and assorted other materials that are difficult to combust completely and that also contain toxic metals. The Environmental Protection Agency, EPA, has established maximum concentrations of eight (8) toxic elements in the leachate from samples subject to the EP toxicity procedure, 40 CFR 261.24 (EPA method 1310). The EP toxicity concentration limits are as follows:

TABLE 1

| Element | Maximum Concentration (mg/l) |
| --- | --- |
| Arsenic | 5.0 |
| Barium | 100.0 |
| Cadmium | 1.0 |
| Chromium | 5.0 |
| Lead | 5.0 |
| Mercury | 0.2 |
| Selenium | 1.0 |
| Silver | 5.0 |

Any soil cement made using the MSWIA would have to have a leachate that contained less than the EPA maximum concentrations for each of the eight elements.

PROCESS

The process described herein produces an improved road base soil cement material formed from municipal solid waste incinerator ash, aggregate material and cement; The soil cement does not suffer from the blistering problem described above, and produces a leachate from the EPA EP toxicity test having maximum concentrations of toxic elements beneath the EPA limits listed in TABLE 1.

With reference to FIG. 1, a preferred apparatus and process for producing the soil cement compositions of the present invention are illustrated. Municipal solid waste incinerator ash, also referred to as MSWIA, ash, or incinerator ash, is passed over a two inch mesh screen 1; incinerator ash having a particle size sufficiently small to fit through two inch screen 1 passes into ash bin 3. A moving belt 5 carries ash 4 from bin 3 toward a first mixing chamber 10.

In a preferred embodiment, a magnetic separator 7 is suspended above ash 4 on belt 5 to remove ferrous metals 8 from ash 4. Ferrous metals 8 can be removed from ash 4 before it enters bin 3, or at a later time; any ferrous metals extracted can be sent to recycling operations.

Aggregate material 13 can be stored in bin 12 and fed by conveyor belt 15 or other means to mixing chamber 10. In a preferred embodiment, ash 4 on belt 5 and aggregate 13 on belt 15 are weighed by scales 18. An integrator 20 is connected to scales 18, and can be programmed to control the quantity of ash 4 and aggregate 13 that pass into chamber 10. Moisture measurements are taken of the feed materials on the input belts 5 and 15, and the integrator 20 is programmed to control the amount of aggregate material mixed with the ash to ensure correct ash to aggregrate ratio in the resulting mixture.

In a preferred embodiment, output 22 on chamber 10 feeds a first stream of ash aggregate 24 onto a one inch mesh screen 26 supported above an ASTM #4 mesh screen 28. Screen 26 is provided to protect the finer ASTM #4 mesh 28. ASTM #4 mesh screen can be replaced with a finer or larger mesh screen provided ash aggregate that passes through screen 28 has a particle size less than three eighths inch ($\frac{3}{8}''$). A second stream 34, comprised of ash aggregate passing through screen 28, enters funnel 30 and exits from output 32.

Screens 26 and 28 tip horizontally downward to form a third stream 36 of ash aggregate having a particle size too large to pass through screen 28. In a preferred embodiment, third stream 36 is passed to belt 38 where it is carried beneath a second magnetic separator 40, and directed into crusher 42. In a preferred embodiment, ash aggregate material can pass quickly through crusher 42 since ferrous metals have been removed magnetically, particles larger than two inches have been sifted out, and the ash aggregate is sufficiently dry to prevent clogging of crusher 42.

Note, before combining the ash with aggregate material, the ash could be screened to remove particles having a size greater than three eighths inch ($\frac{3}{8}''$); particles larger than three eighths inch could then be crushed, and after crushing and sifting, particles having a size less than three eighths inch could be combined with an aggregate material to form ash aggregate. However, the high moisture content of the ash makes sifting and crushing difficult, and slows down processing operations.

In a preferred embodiment third stream 36 of ash aggregate 24 passes out of outlet 44 onto a one inch screen 46 held above an ASTM #4 mesh screen 48. Mesh screens 46 and 48 can be replaced with other sifting means provided only particles less than three eighths inch remain in the ash aggregate stream that is to be used in the soil cement. Ash aggregate particles having a size sufficiently small to pass through screen 48 form a fourth stream 50 that is conveyed by a belt 52 to a bin or funnel 54. A fifth stream 56 is formed of ash aggregate having a particle size too great to pass through screen 48.

Second stream 34 and fourth stream 50 of ash aggregate 24 are combined in bin 54 and carried by belt 57 to a hopper 58. In a preferred embodiment, the ash aggregate comprises 25 percent incinerator ash and 75 percent of an aggregate material; the aggregate material can be a mixture of sand and shell, gravel, crushed stone, silicious solids, shell, granite, sand, lime rock and/or calcarious solids. In a preferred embodiment, this ash aggregate also may be called PERMABASE-PLUS AGGREGATE.

In a preferred embodiment, cement 60 is stored in silo or hopper 62 and is fed from outlet 64 onto belt 66; second stream 34 of ash aggregate 24 passes out of hopper 58 through outlet 68 onto belt 70. Belts 66 and 70 lead to a second mixing chamber 72, which, in a preferred mode, is a pug mill mixer. Scales 74 on belts 66 and 70 measure the weight of material on belts 66 and 70, and are connected to a second integrator 76 that controls the quantity of cement 60 and ash aggregate passing into chamber 72. Soil cement 80 exiting from outlet 78 on chamber 72 can then be shipped directly to a job site. In a preferred embodiment, the soil cement made by combining cement with an ash aggregate comprising ash and a sand/shell mixture, is referred to as PERMABASE-PLUS.

Moisture control is very important in the production of a high strength soil cement composition. The ash aggregate, when combined with cement, desirably has a moisture content that approximates the optimum moisture content for that particular composition to achieve the maximum possible compressive strength. Therefore, it may be necessary in some cases to add additional moisture to the ash aggregate and cement combination, or to allow the ash aggregate to dry before combining it with cement. After moisture content measurements are taken of samples from the 5, 15, 66 and 70, integrators 20 and 76 can be programmed to control the quantity of material entering mixing chambers 10 and 72 so as to carefully adjust the quantity of each component. If additional moisture is required, it can be added in mixing chamber 72.

The municipal solid waste incinerator ash is generally a wet, heterogeneous mixture which can stick to or clog equipment; by combining the MSWIA with an appropriate aggregate material, the mixture becomes easier to handle. In a preferred embodiment, wet MSWIA is combined with a low moisture sand/shell aggregate material; the resulting ash aggregate has a damp sand texture suitable for easy manipulation in the processing plant.

The soil cement can be designed to meet particular job specifications and to conform with state and/or federal construction and environmental requirements. In a preferred embodiment, a sand/shell aggregate material is combined with MSWIA using the general process described above; the ash aggregate can be formed by combining about 1 to 50 percent incinerator ash with about 50 to 99 percent sand/shell aggregate material; the moisture content of this ash aggregate can then be adjusted to range between one and thirteen percent (1 to 13%). In another preferred embodiment, sand/shell aggregate material is used which comprises between zero and five percent (0 to 5%) particles having a diameter less than 75 microns; when the ash aggregate is combined with portland cement or other suitable cementitious material, the combination has a moisture content ranging from about eight to 12 percent (8 to 12%). In still another preferred embodiment, the resulting soil cement will comprise less than 3 percent total organics; this is required by the Florida Department of Transportation Standard Specification for Road and Bridge Construction, Section 270, for soil cement bases used in the State of Florida.

The invention will be better understood from a detailed description of specific embodiments, using non-limiting examples, which relate to the formation of soil cement compositions made from cement combined with aggregate materials containing MSWIA.

EXAMPLES

Figure 2:
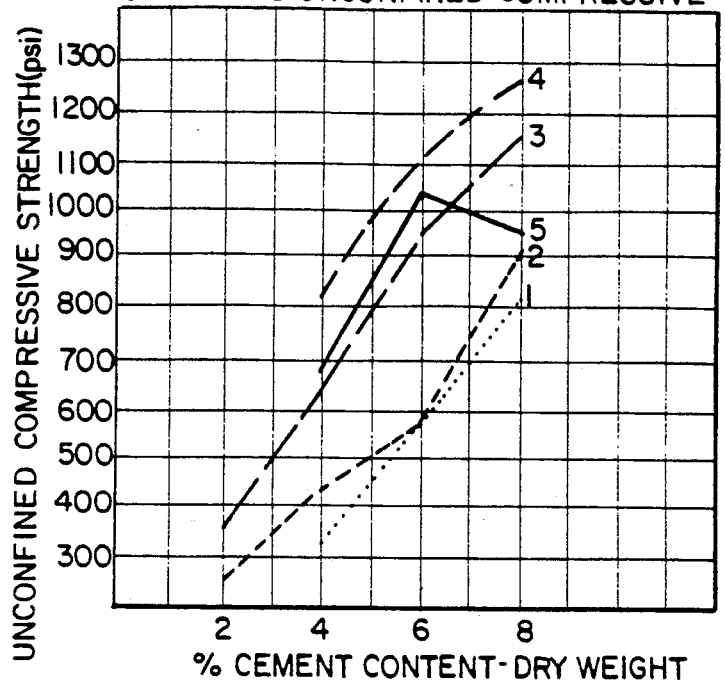
FIG. 2 is a graph comparing the unconfined compressive strengths of compositions containing varying amounts of cement, municipal solid waste incinerator ash and aggregate material and a moisture content approximating the optimum moisture content.
Figure 3:
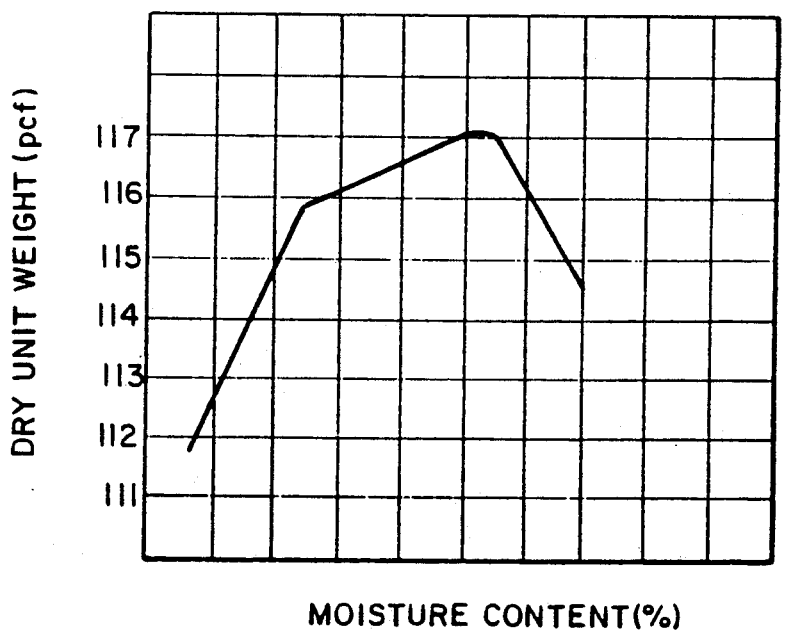
FIG. 3 is a graph of moisture content versus density for a composition made from two percent portland cement combined with an ash aggregate containing 25 percent municipal solid waste incinerator ash and 75 percent sand/shell aggregate material.
Figure 4:
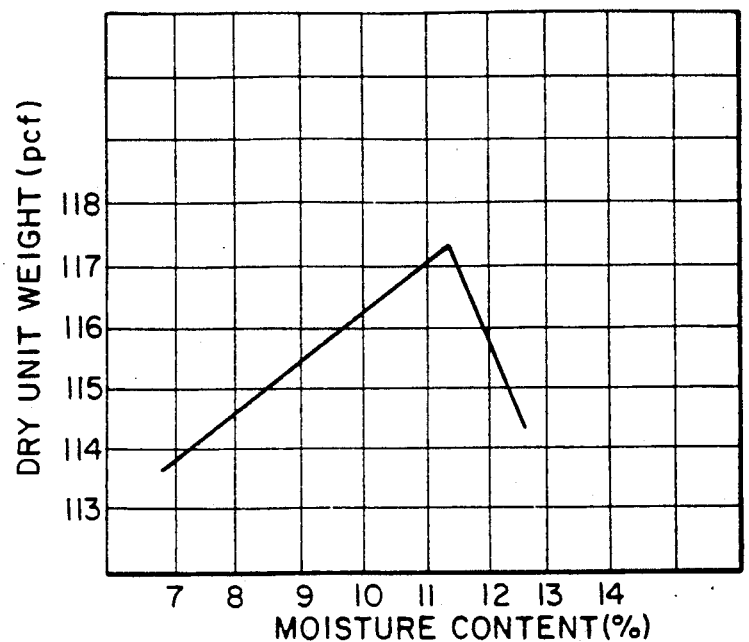
FIG. 4 is a graph of moisture content versus density for a composition made from four percent portland cement combined with an ash aggregate containing 25 percent municipal solid waste incinerator ash and 75 percent sand/shell aggregate material.
Figure 5:
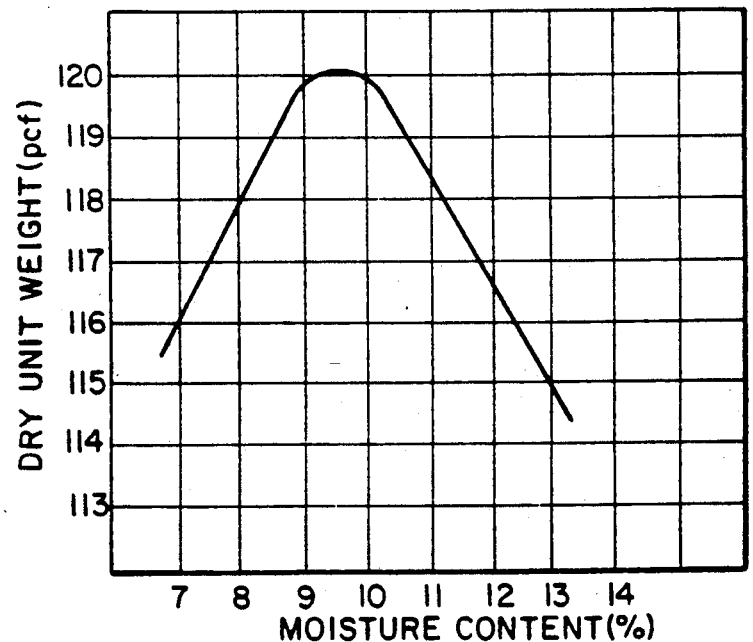
FIG. 5 is a graph of moisture content versus density for a composition made from six percent portland cement combined with an ash aggregate containing 25 percent municipal solid waste incinerator ash and 75 percent sand/shell aggregate material.
Figure 6:
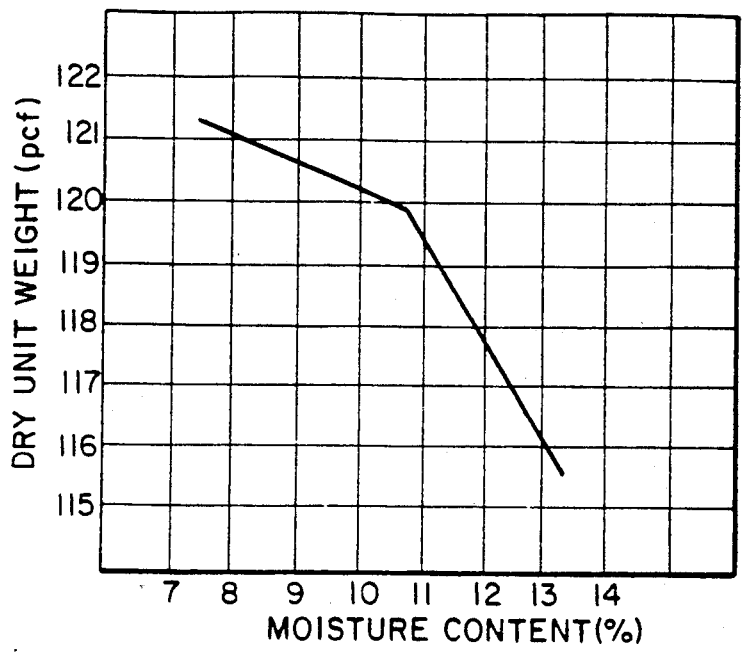
FIG. 6 is a graph of moisture content versus density for a base composition made from eight percent portland cement combined with an ash aggregate containing 25 percent municipal solid waste incinerator ash and 75 percent sand/shell aggregate material.
Figure 7:
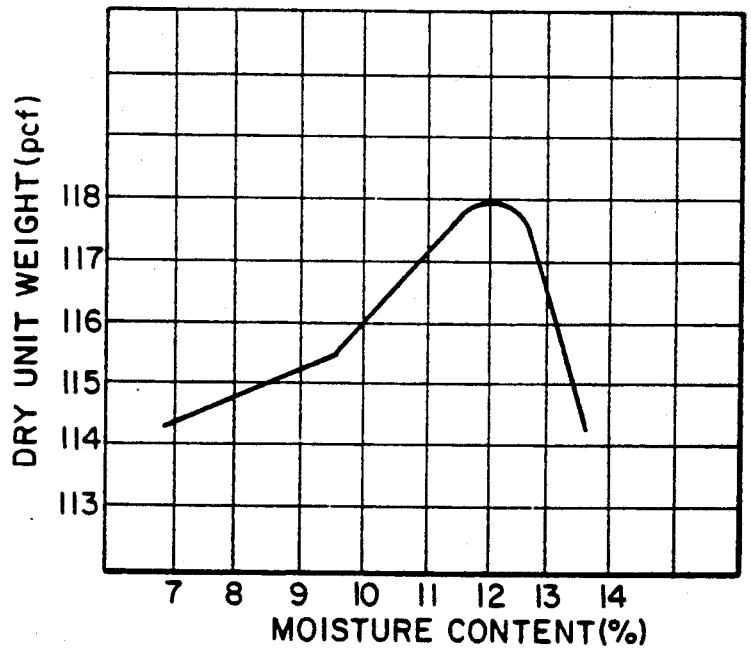
FIG. 7 is a graph of moisture content versus density for a composition made from two percent portland cement combined with an ash aggregate containing 50 percent municipal solid waste incinerator ash and 50 percent sand/shell aggregate material.
Figure 8:
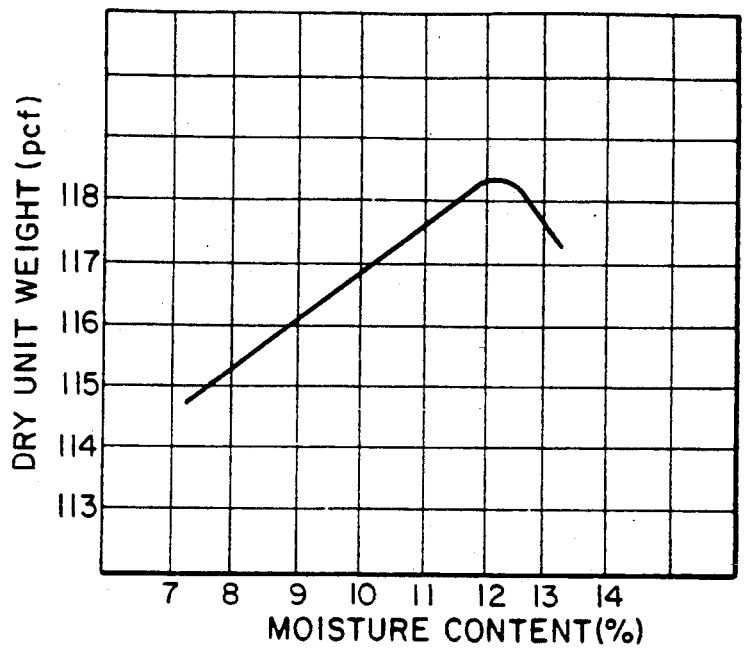
FIG. 8 is a graph of moisture content versus density for a composition made from four percent portland cement combined with an ash aggregate containing 50 percent municipal solid waste incinerator ash and 50 percent sand/shell aggregate material.
Figure 9:
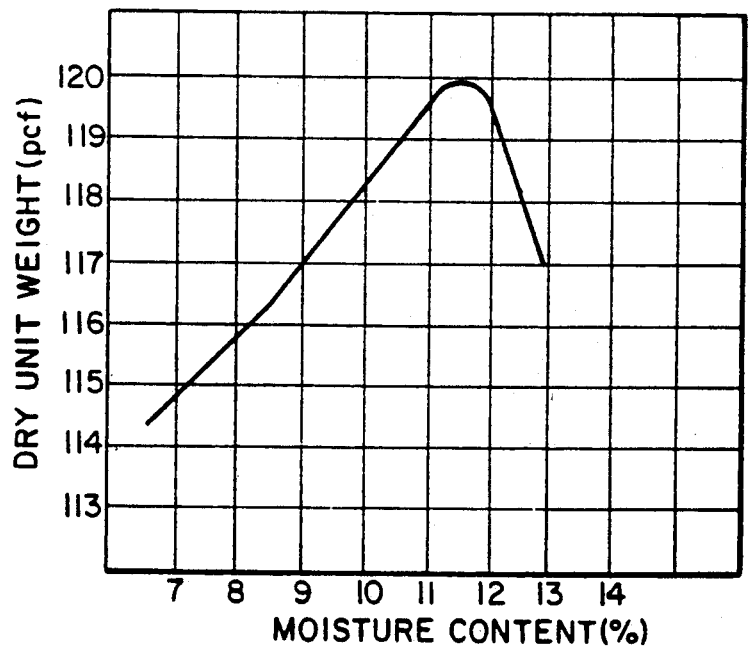
FIG. 9 is a graph of moisture content versus density for a composition made from six percent portland cement combined with an ash aggregate containing 50 percent municipal solid waste incinerator ash and 50 percent sand/shell aggregate material.
Figure 10:
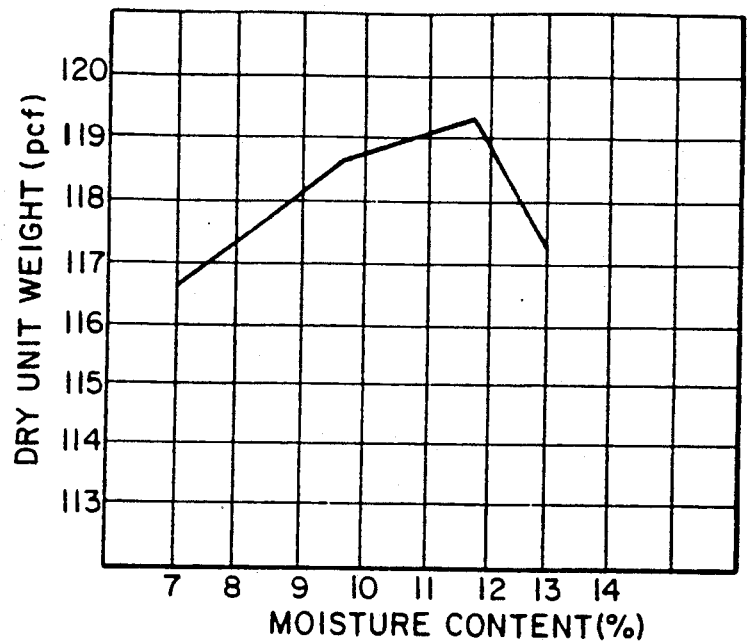
FIG. 10 is a graph of moisture content versus density for a composition made from eight percent portland cement combined with an ash aggregate containing 50 percent municipal solid waste incinerator ash and 50 percent sand/shell aggregate material.

With reference to FIG. 2, seven day unconfined compressive strengths of soil cement samples, prepared with the process of the present invention, are compared with the percentage of cement added to an aggregate or ash aggregate; the compositions had moisture contents at or near the optimum moisture content. Line 1 represents the unconfined compressive strength of a non-MSWIA soil cement composition combined with four, six, and eight percent portland cement. Line 2 represents the unconfined compressive strength of a soil cement composition formed with an ash aggregate containing 25 percent MSWIA and 75 percent aggregate material that is combined with two, four, six and eight percent portland cement. Line 3 represents the unconfined compressive strength of a soil cement composition formed with an ash aggregate containing 50 percent MSWIA and 50 percent aggregate material combined with two, four, six and eight percent portland cement. Line 4 represents the unconfined compressive strength of a soil cement composition formed with an ash aggregate containing 75 percent MSWIA and 25 percent aggregate material combined with four, six, and eight percent portland cement. Line 5 represents the unconfined compressive strength of a soil cement composition comprising 100 percent MSWIA mixed with four, six, or eight percent portland cement.

Note that in all cases, the unconfined compressive strengths of the soil cement compositions containing MSWIA meet or exceed the compressive strength after seven days of soil cement made with a non-ash-containing aggregate mixed with portland cement. All of the unconfined compressive strength figures were determined on samples having optimal moisture content for reasons to be described hereinafter.

Figure 11:
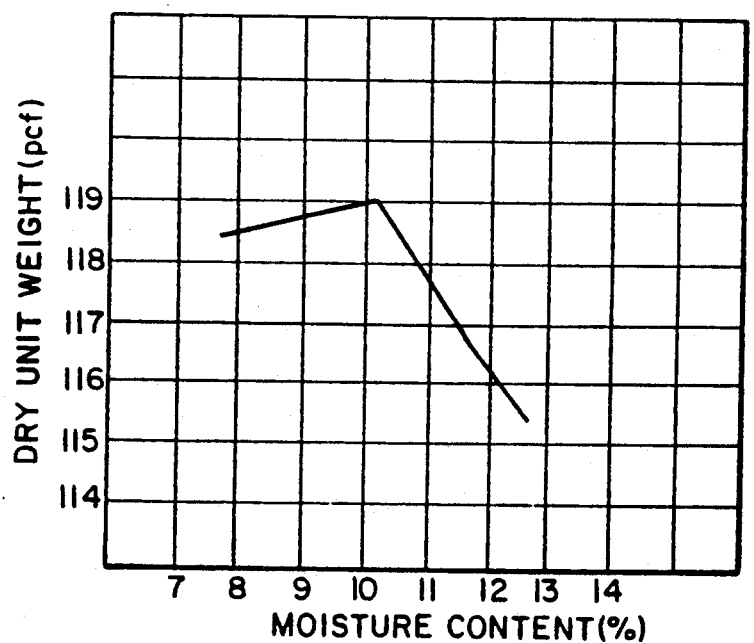
FIG. 11 is a graph of moisture content versus density for a composition made from four percent portland cement combined with an ash aggregate containing 75 percent municipal solid waste incinerator ash and 25 percent sand/shell aggregate material.
Figure 12:
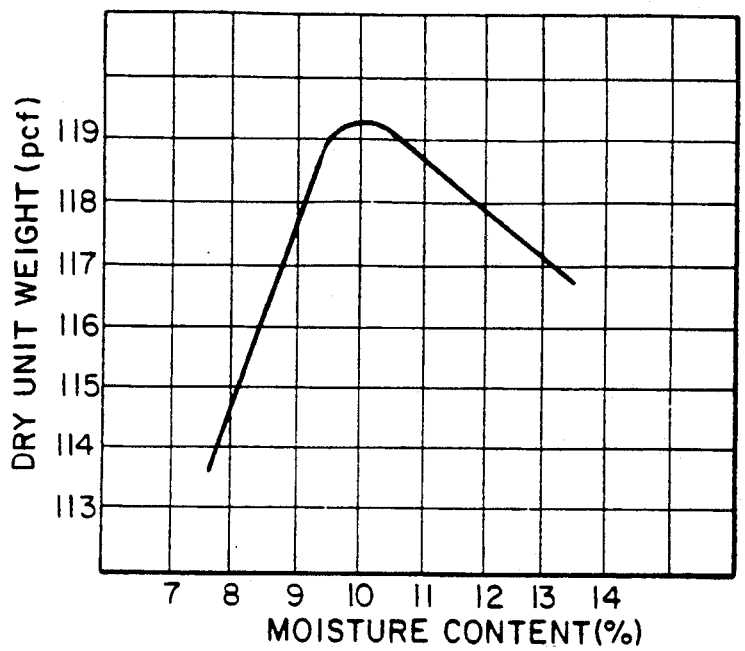
FIG. 12 is a graph of moisture content versus density for a composition made from six percent portland cement combined with an ash aggregate containing 75 percent municipal solid waste incinerator ash and 25 percent sand/shell aggregate material.
Figure 13:
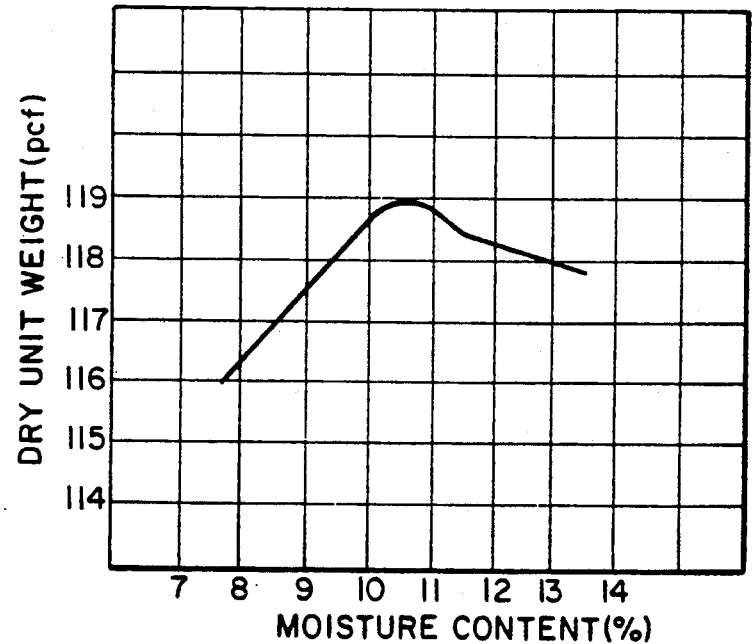
FIG. 13 is a graph of moisture content versus density for a composition made from eight percent portland cement combined with an ash aggregate containing 75 percent municipal solid waste incinerator ash and 25 percent sand/shell aggregate material.
Figure 14:
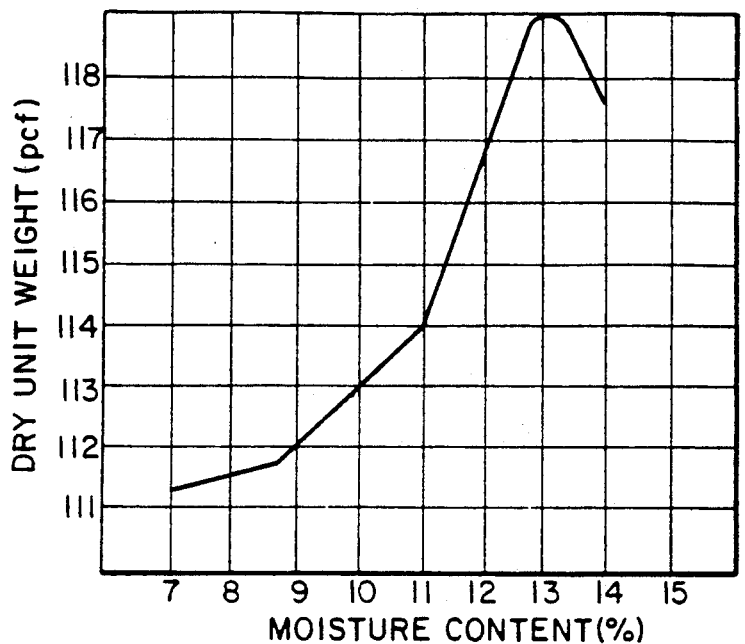
FIG. 14 is a graph of moisture content versus density for a composition made from municipal solid waste incinerator ash alone mixed with four percent portland cement.
Figure 15:
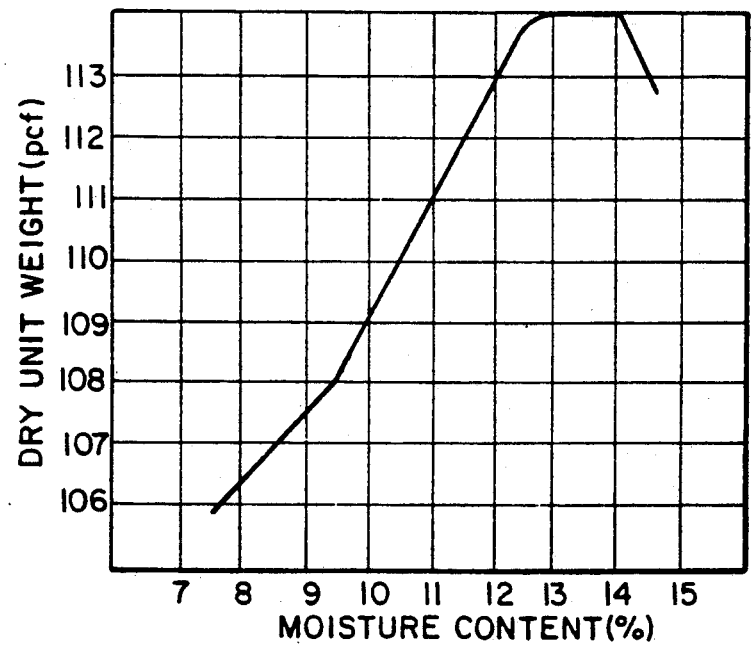
FIG. 15 is a graph of moisture content versus density for a composition made from municipal solid waste incinerator ash alone mixed with six percent portland cement.
Figure 16:
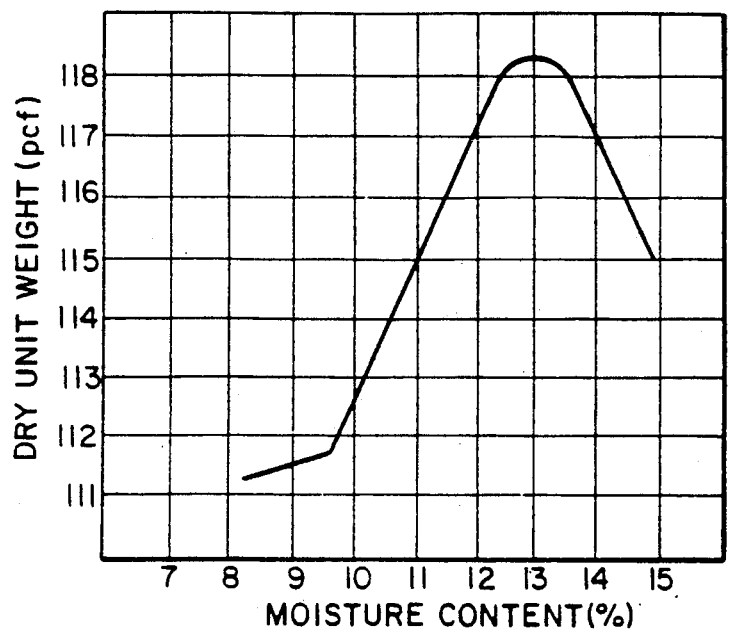
FIG. 16 is a graph of moisture content versus density for a composition made from municipal solid waste incinerator ash alone mixed with eight percent portland cement.
Figure 17:
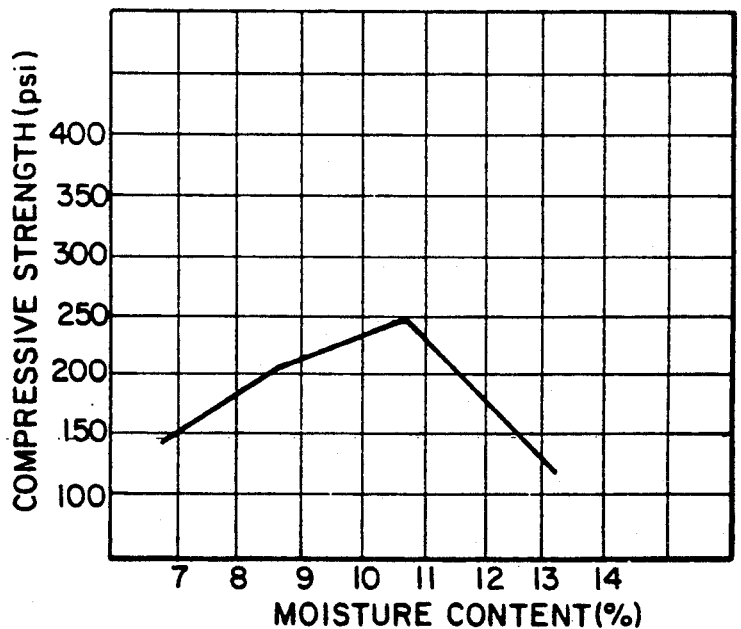
FIG. 17 is a graph of moisture content versus seven day unconfined compressive strength for a composition made from two percent portland cement combined with an ash aggregate containing 25 percent municipal solid waste incinerator ash and 75 percent sand/shell aggregate.
Figure 18:
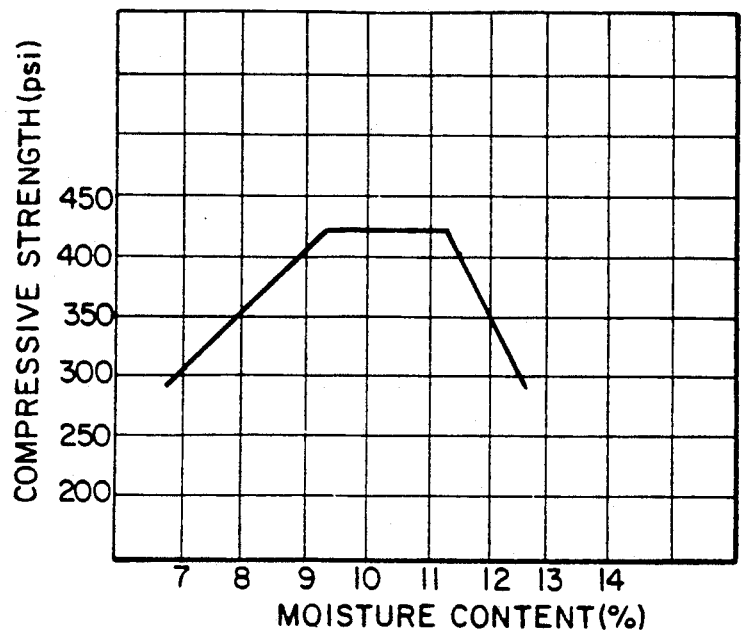
FIG. 18 is a graph of moisture content versus seven day unconfined compressive strength for a composition made from four percent portland cement combined with an ash aggregate containing 25 percent municipal solid waste incinerator ash and 75 percent sand/shell aggregate.
Figure 19:
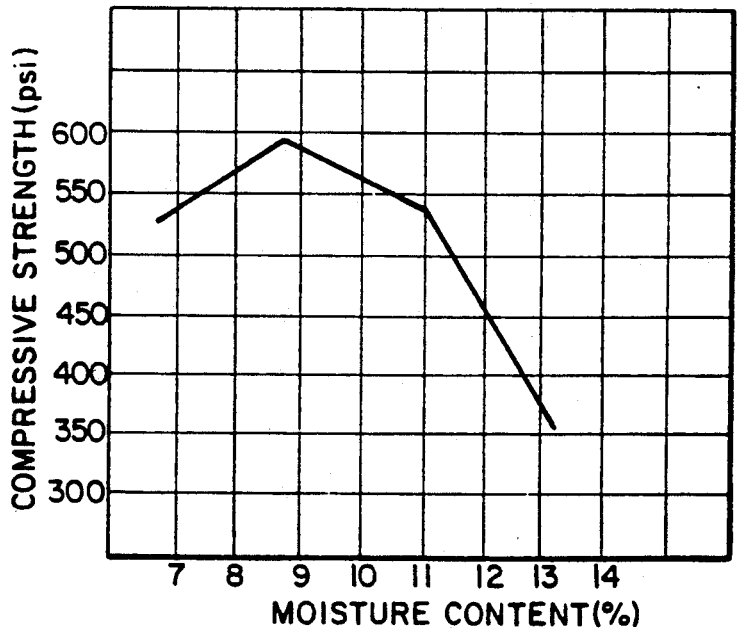
FIG. 19 is a graph of moisture content versus seven day unconfined compressive strength for a composition made from six percent portland cement combined with an ash aggregate containing 25 percent municipal solid waste incinerator ash and 75 percent sand/shell aggregate.
Figure 20:
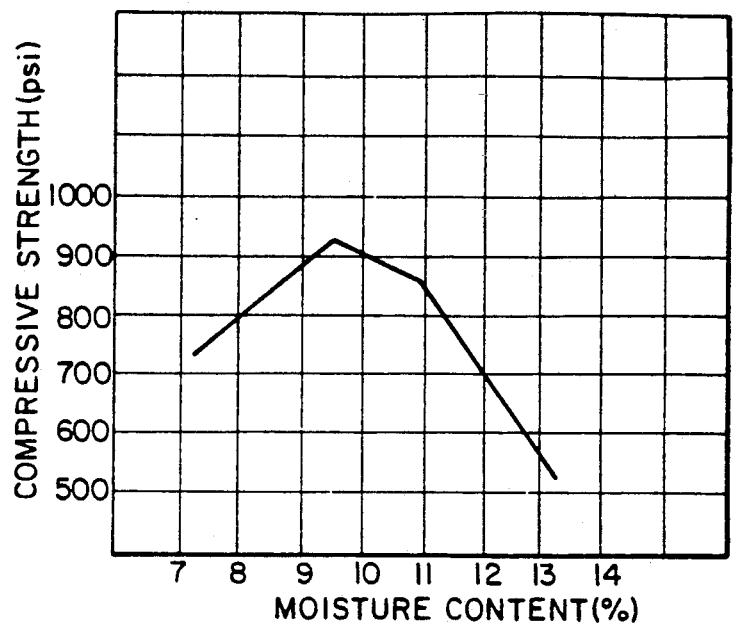
FIG. 20 is a graph of the moisture content versus seven day unconfined compressive strength for a composition made from eight percent portland cement combined with an ash aggregate containing 25 percent municipal solid waste incinerator ash and 75 percent sand/shell aggregate.
Figure 21:
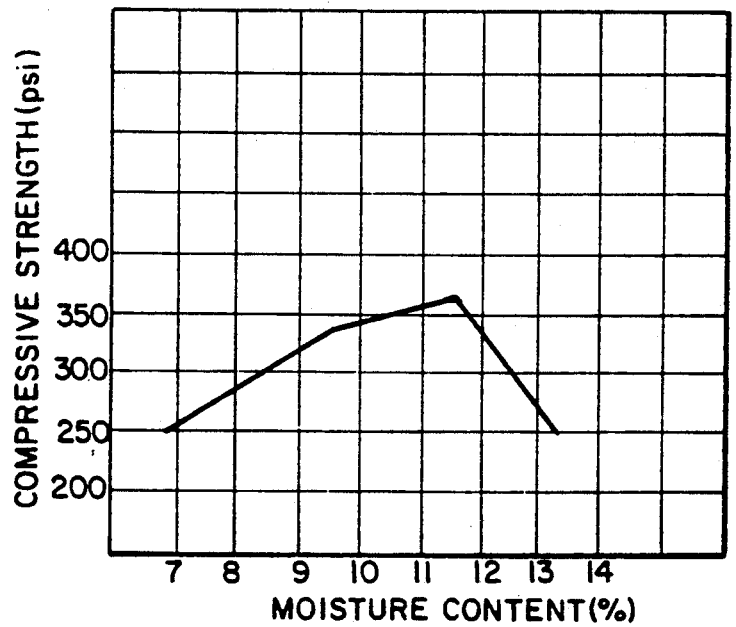
FIG. 21 is a graph of moisture content versus seven day unconfined compressive strength for a composition made from two percent portland cement combined with an ash aggregate comprising 50 percent municipal solid waste incinerator ash and 50 percent sand/shell aggregate material.
Figure 22:
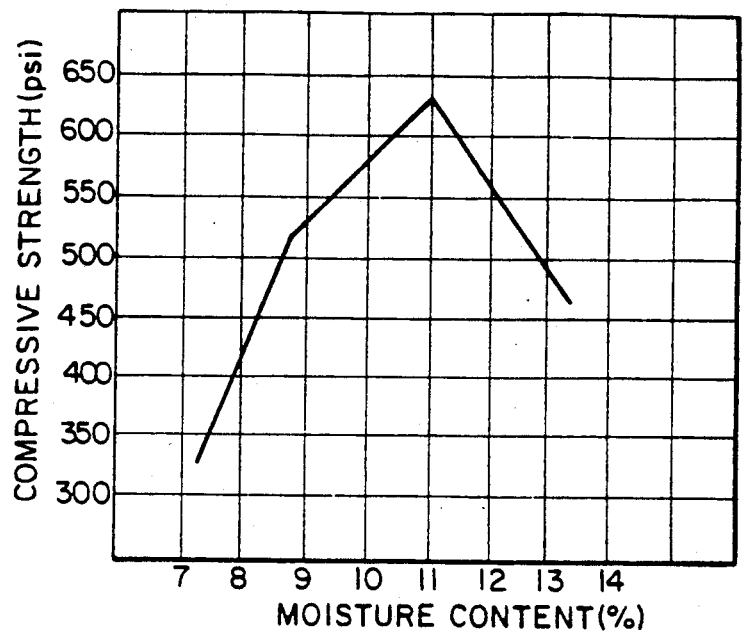
FIG. 22 is a graph of moisture content versus seven day unconfined compressive strength for a composition made from four percent portland cement combined with an ash aggregate comprising 50 percent municipal solid waste incinerator ash and 50 percent sand/shell aggregate material.
Figure 23:
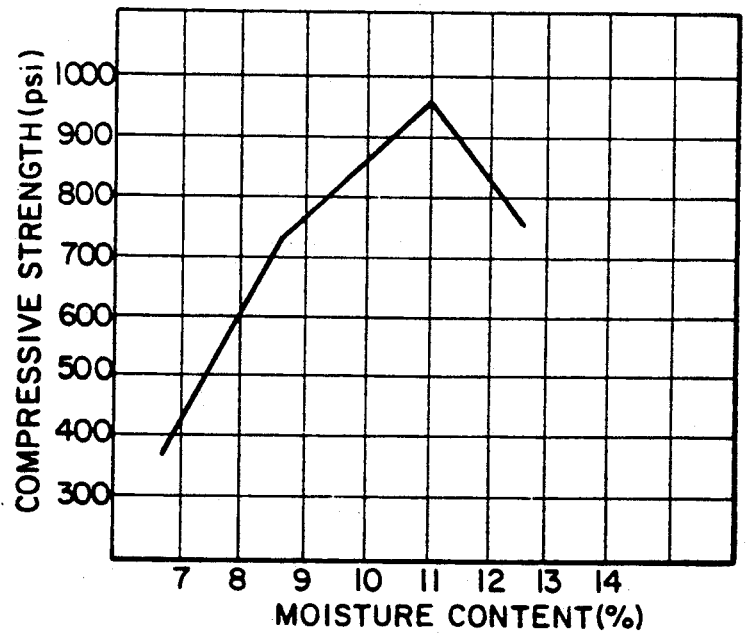
FIG. 23 is a graph of moisture content versus seven day unconfined compressive strength for a composition made from six percent portland cement combined with an ash aggregate comprising 50 percent municipal solid waste incinerator ash and 50 percent sand/shell aggregate material.
Figure 24:
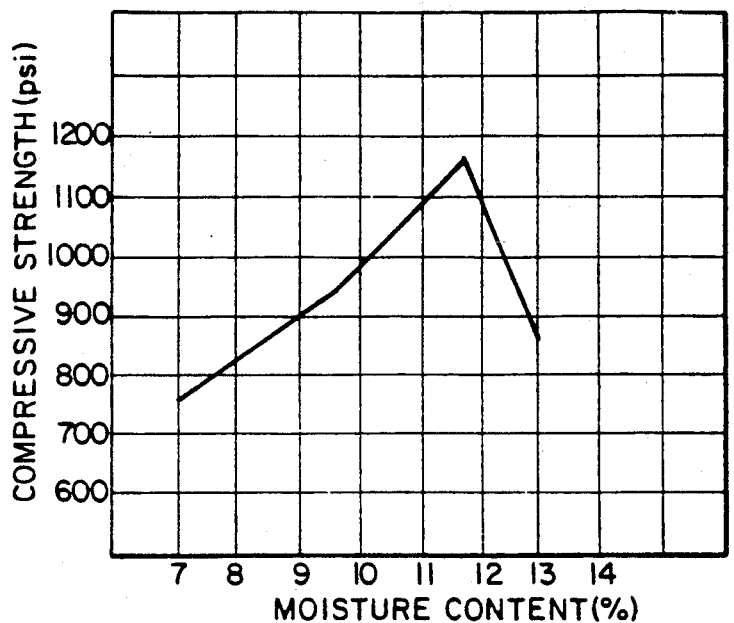
FIG. 24 is a graph of moisture content versus seven day unconfined compressive strength for a composition made from eight percent portland cement combined with an ash aggregate comprising 50 percent municipal solid waste incinerator ash and 50 percent sand/shell aggregate material.

With reference to FIG. 3, FIG. 4, FIG. 5 and FIG. 6, soil cement moisture content versus density is plotted for soil cements having an ash aggregate, containing 25 percent MSWIA and 75 percent sand/shell aggregate material, which is combined with varying quantities of portland cement. FIG. 7, FIG. 8, FIG. 9 and FIG. 10 show moisture content versus density for soil cement compositions containing an ash aggregate comprising 50 percent MSWIA and 50 percent sand/shell aggregate material combined with two, four, six and eight percent portland cement. FIG. 11, FIG. 12 and FIG. 13 show moisture content versus density for a soil cement made with an ash aggregate comprising 75 percent MSWIA and 25 percent sand/shell aggregate material combined with four, six and eight percent portland cement. FIG. 14, FIG. 15 and FIG. 16 show moisture content versus density curves for a composition comprising 100 percent MSWIA combined with four, six, and eight percent portland cement.

Note that in FIGS. 3 through 16, as moisture content increases, all of the moisture content versus density curves reach a maximum density, after which the density declines with increasing moisture content. The highest point on each moisture content versus density curve is the maximum density of that particular soil cement composition and corresponds to the optimum moisture content. In order to obtain these curves, the soil cement samples were air dried, and moisture was added to obtain the different moisture content percentages. The soil cement samples were then compacted under pressure and their densities determined in accordance with the well known American Association of State Highway and Transportation Officials, AASHTO, Procedure T-99.

The peak of each curve illustrated in FIGS. 3 through 16 indicates that the optimum moisture content for each of the different compositions ranges from seven to thirteen percent, except for the compositions, shown in FIGS. 14, 15 and 16, comprising 100% MSWIA combined with cement, which have optimum moisture contents greater than 13%.

Control of moisture is important since, in certain locations throughout the United States, such as Florida, soil cement used in road bases is required to be compacted in place to within 95 percent of its maximum density as determined by its optimum moisture content. As can be seen by the moisture content versus density curves, the optimum moisture content is between eight and twelve percent for preferred compositions to achieve maximum density.

Figure 25:
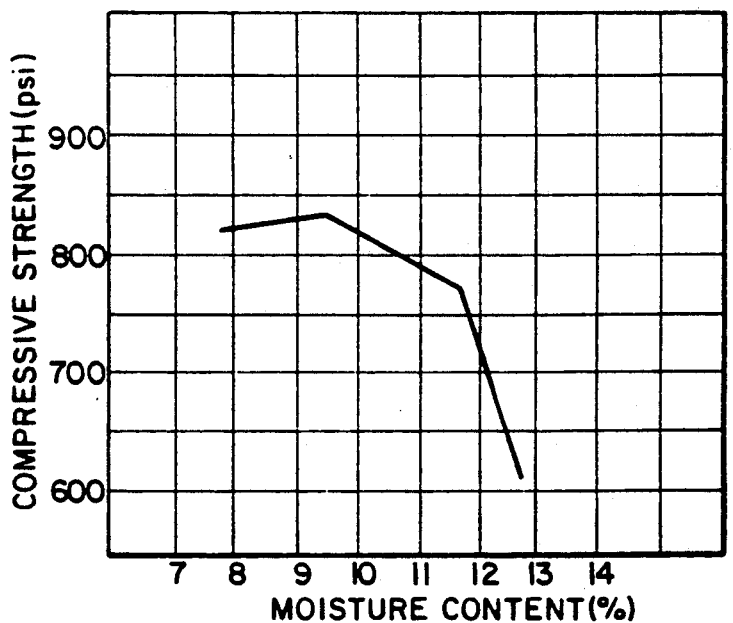
FIG. 25 is a graph of moisture content versus seven day unconfined compressive strength for a composition made from four percent portland cement combined with an ash aggregate comprising 75 percent municipal solid waste incinerator ash and 25 percent sand/shell aggregate material.
Figure 26:
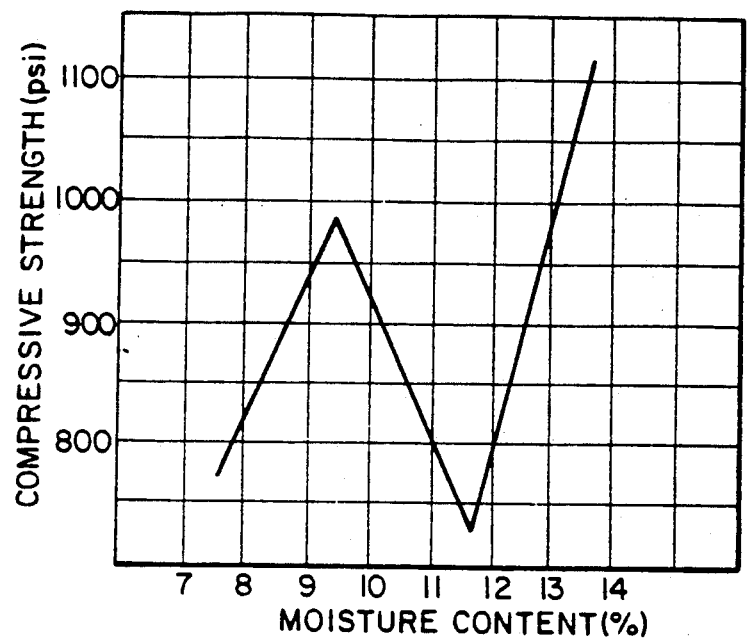
FIG. 26 is a graph of moisture content versus seven day unconfined compressive strength for a composition made from six percent portland cement combined with an ash aggregate comprising 75 percent municipal solid waste incinerator ash and 25 percent sand/shell aggregate material.
Figure 27:
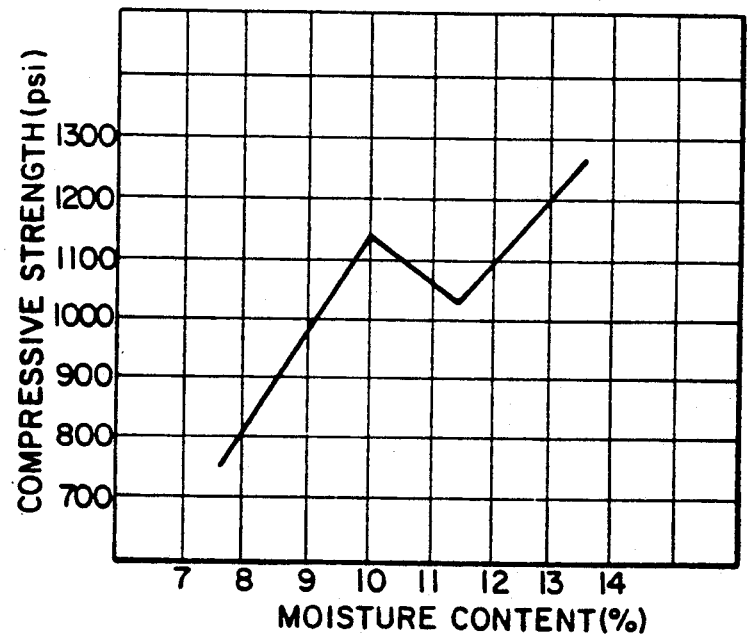
FIG. 27 is a graph of moisture content versus seven day unconfined compressive strength for a composition made from eight percent portland cement combined with an ash aggregate comprising 75 percent municipal solid waste incinerator ash and 25 percent sand/shell aggregate material.
Figure 28:
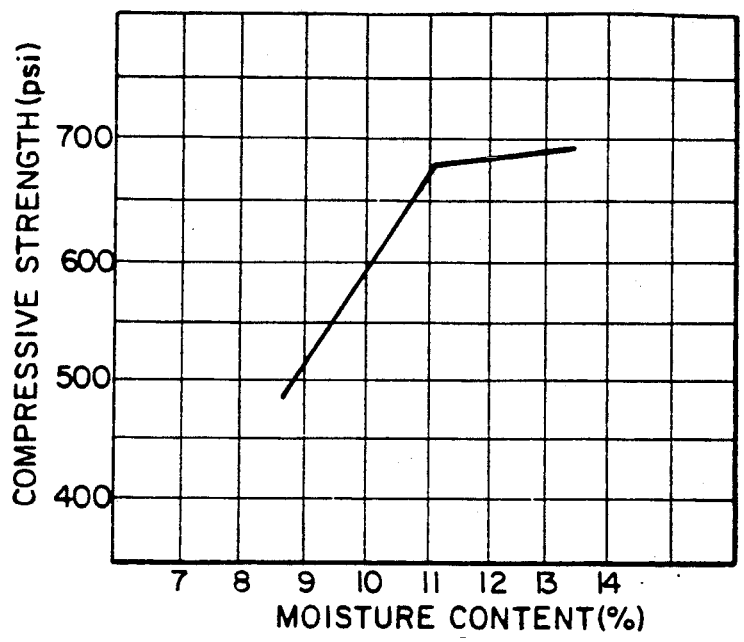
FIG. 28 is a graph of moisture content versus seven day unconfined compressive strength for a composition made of municipal solid waste incinerator ash alone combined with four percent cement.
Figure 29:
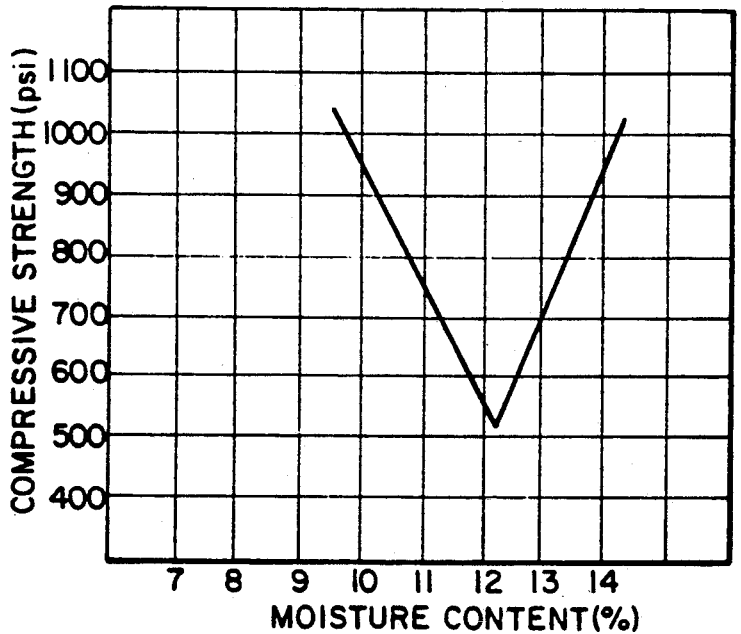
FIG. 29 is a graph of moisture content versus seven day unconfined compressive strength for a composition made of municipal solid waste incinerator ash alone combined with six percent cement.
Figure 30:
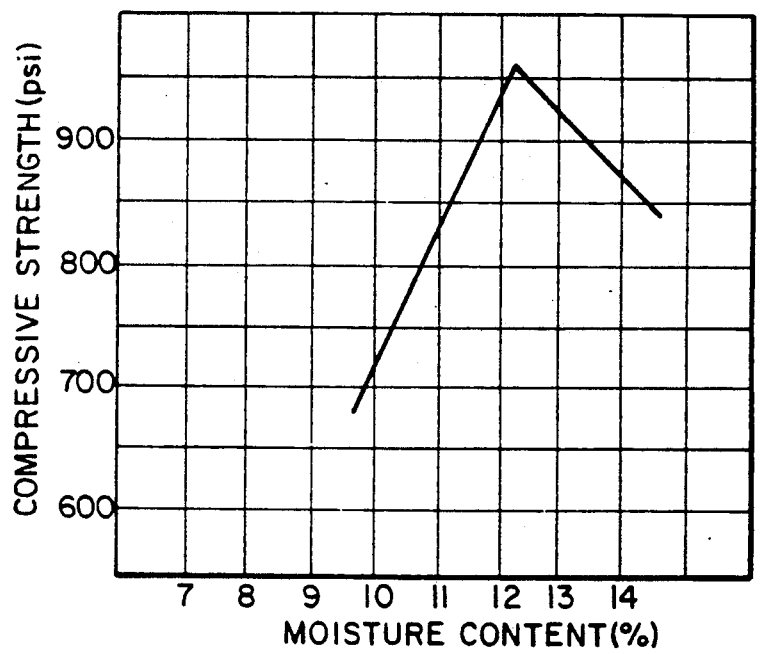
FIG. 30 is a graph of moisture content versus seven day unconfined compressive strength for a composition made of municipal solid waste incinerator ash alone combined with eight percent cement.

With reference to FIG. 17, FIG. 18, FIG. 19 and FIG. 20, moisture contents versus seven day unconfined compressive strengths of soil cement samples made from an ash aggregate, comprising 25 percent MSWIA and 75 percent sand/shell aggregate material combined with two, four, six and eight percent portland cement are shown. FIG. 21, FIG. 22, FIG. 23 and FIG. 24 show moisture content versus seven day unconfined compressive strength curves for soil cement compositions having an ash aggregate, comprising 50 percent MSWIA and 50 percent sand/shell aggregate material combined with two, four, six and eight percent cement. FIG. 25, FIG. 26 and FIG. 27 show moisture content versus seven day unconfined compressive strength curves for soil cements formed with an ash aggregate, comprising 75 percent MSWIA and 25 percent sand/shell aggregate material, combined with four, six and eight percent portland cement. FIG. 28, FIG. 29 and FIG. 30 represent moisture content versus seven day unconfined compressive strength curves for soil cements formed from 100 percent MSWIA combined with four, six and eight percent portland cement.

Note in FIGS. 17 through 25, as moisture content increases, compressive strength increases to a maximum and then decreases. However, the moisture content versus seven day unconfined compressive strength curves in FIGS. 26 through 29 show no discernable pattern; the curves in FIGS. 25 and 30, while showing peak stresses at 830 and 955 psi respectively, are misleading since many of the soil cement pills formed of aggregates containing 75 or 100 percent MSWIA mixed with cement tend not to form stable solids or crumbled and blistered apart over longer periods of time. Therefore, it was difficult or impossible to predict the compressive strength of compositions containing more that 75% MSWIA in the ash aggregate used. At higher cement concentrations, stable solids can be formed with aggregate material containing more that 50% MSWIA, but this results in increased costs which could be avoided if less MSWIA is used.

It becomes apparent from FIG. 2 and FIGS. 17 through 30 that MSWIA increases the strength of any soil cement to which it is added; however, obtaining a predictable compressive strength in a stable solid is unlikely when using an ash aggregate having concentrations of MSWIA in excess of 75 percent, unless large amounts of cement are also added. Thus, in a preferred embodiment, there appear to be two critical limitations on the use of municipal solid waste incinerator ash in soil cement compositions; the municipal solid waste incinerator ash must have a particle size less than three eighths inch and the MSWIA must comprise less than 50 percent of the ash aggregate which is mixed with portland cement to form the soil cement. Although portland cement is used in several preferred embodiments, it is understood that any cementitious material which is capable of binding ash aggregate together in a similar fashion can be used.

ENVIRONMENTAL TESTING

EXAMPLE 1

Four broken soil cement specimens containing MSWIA were subjected to a rain water leaching simulation. The specimens comprised an ash aggregate, having 25 percent MSWIA and 75 percent sand/shell aggregate material, combined with 5% portland cement, the mixtures having a moisture content approximating the optimum moisture content; the soil cement compositions were then compressed into pills and cured. After curing, the specimens were broken into one quarter inch to one inch ($\frac{1}{4}''$ to $1''$) pieces so as to simulate rubble generated at a road construction site. One half of the pieces were subjected to seven days leaching in a small tank of constantly circulated deionized water to simulate rain water. The other half of the pieces were placed in an identical tank and leached with uncirculated or stagnant deionized water for a seven day test period. Cadmium and lead measurements were then made on the filtered leachate obtained from subsamples. As cadmium and lead were the two elements of most concern, these were the only ones tested for. The results are shown in the table below with dissolved metals represented in milligrams per liter:

TABLE 2

| Sample | Leaching Time | Cadmium mg/l | Lead mg/l |
| --- | --- | --- | --- |
| 05A Leachate from Uncir. Tank | 24 hours | <0.01 | <0.1 |
| 05B Leachate from Circ. Tank | 24 hours | <0.01 | <0.1 |
| 05C Leachate from Uncirc. Tank | 3 days | <0.01 | <0.1 |
| 05D Leachate from Circ. Tank | 3 days | <0.01 | <0.1 |
| 05E Leachate from Uncirc. Tank | 7 days | <0.01 | <0.1 |
| 05F Leachate from Circ. Tank | 7 days | <0.01 | <0.1 |

The results in TABLE 2 show that the soil cement specimens tested have rainwater leachates that contain levels of cadmium and lead below the detection limits of the test.

EXAMPLE 2

An EPA EP toxicity analysis, 40 CFR 261.24, EPA Method 1310, was performed on municipal solid waste incinerator ash samples obtained on two separate days from a municipal solid waste incinerator facility. The extracts from the extraction procedure (EP) were then analyzed for eight elements for which the EPA has determined maximum environmentally safe concentrations. The results are shown in Table 3 below:

TABLE 3

| Element | Ash Sample 1 mg/l | Ash Sample 2 mg/l | EPA Maximum Concentration mg/l |
| --- | --- | --- | --- |
| Arsenic | 0.002 | 0.002 | 5.0 |
| Barium | 0.7 | 0.5 | 100.0 |
| Cadmium | 1.1 | 1.2 | 1.0 |
| Chromium | 0.10 | 0.11 | 5.0 |
| Lead | 11. | 10. | 5.0 |
| Mercury | <0.0004 | <0.0004 | 0.2 |
| Selenium | <0.001 | <0.001 | 1.0 |
| Silver | <0.01 | <0.01 | 5.0 |

Table 3 demonstrates that the municipal solid waste incinerator ash to be used in the soil cement contains dangerously high levels of lead and cadmium in its raw state; the lead concentrations are at least twice the EPA maximum, and the cadmium concentrations are 10 and 20 percent greater than the EPA maximum concentrations for Samples 1 and 2 respectively.

EXAMPLE 3

The EP toxicity procedure, 40 CFR 261.24, EPA Method 1310, was then performed on soil cement samples made from an ash aggregate combined with five percent portland cement by dry weight. The ash aggregate comprised 75 percent sand/shell aggregate material mixed with 25 percent of the same municipal solid waste incinerator ash for which results are presented in Table 3, and was sifted to have a particle size sufficiently small to pass through an ASTM No. 4 mesh screen. After mixing the ash aggregate with 5 percent cement by dry weight, a soil cement pill was formed using standard Florida Department of Transportation Method 5520. The soil cement pill was allowed to cure for seven days and two core specimens were cut from the soil cement pill according to specifications for monolithic samples. The leachates from the two core samples were tested for toxicity; leachates containing elemental concentrations greater than the EPA maximum allowable concentrations indicate that the soil cement composition producing the leachate would be considered hazardous to the environment. All of the elements tested for had concentrations beneath the EPA toxicity limits as shown in TABLE 4 below:

TABLE 4

| Element | Core No. 1 mg/l | Core No. 2 mg/l | EPA Maximum Concentration mg/l |
| --- | --- | --- | --- |
| Arsenic | 0.002 | 0.001 | 5.0 |
| Barium | <0.1 | <0.1 | 100.0 |
| Cadmium | 0.080 | 0.092 | 1.0 |
| Chromium | <0.4 | <0.4 | 5.0 |
| Lead | 3.8 | 3.1 | 5.0 |
| Mercury | 0.0004 | 0.0004 | 0.2 |
| Selenium | 0.002 | 0.002 | 1.0 |
| Silver | <0.02 | 0.02 | 5.0 |

Table 4 shows that the only elements having concentrations close to the EPA maximum concentrations were cadmium and lead; however these levels are substantially lower than for the raw MWSIA. Additional experiments were then performed to determine if the cadmium and lead concentrations would increase or decrease in EP toxicity procedure leachates from samples cured for longer time periods.

EXAMPLE 4

Soil cement specimens were prepared with an ash aggregate comprising 75 percent sand/shell aggregate material mixed with 25 percent MSWIA; the ash aggregate was sifted to remove any particles too large to pass through an ASTM No. 4 mesh screen. The ash aggregate too large to pass through an ASTM #4 mesh screen is crushed and sifted through an ASTM #4 mesh screen. Particles passing through the ASTM #4 mesh screen are then combined with the previously sifted ash aggregate having a particle size small enough to pass through an ASTM #4 mesh screen. The ash aggregate was combined with five percent portland cement by dry weight, and the moisture was adjusted to approximate the optimum moisture content. The composition was then compacted into soil cement pills, and the pills were allowed to cure. Four soil cement pills had subsamples taken after cure times of seven, fourteen, twenty one and twenty eight day periods, and the subsamples were subjected to the EP toxicity procedure. The extracts were then analyzed for cadmium and lead concentrations; the results are shown in Table 5 below:

TABLE 5

| Sample No. | Leach Time Days | Cadmium mg/l | Lead mg/l |
| --- | --- | --- | --- |
| 02A | 7 | 0.18 | 0.73 |
| 06A | 7 | 0.28 | 2.0 |
| 10A | 7 | 0.28 | 1.7 |
| 14A | 7 | 0.16 | 0.73 |
| 02B | 14 | 0.18 | 0.42 |
| 06B | 14 | 0.26 | 3.3 |
| 10B | 14 | 0.17 | 0.15 |
| 14B | 14 | 0.20 | 2.2 |
| 02C | 21 | 0.18 | 1.5 |
| 06C | 21 | 0.24 | 0.32 |
| 10C | 21 | 0.32 | 1.2 |
| 14C | 21 | 0.18 | 1.5 |
| 02D | 28 | 0.16 | <0.1 |
| 06D | 28 | 0.29 | 1.8 |
| 10D | 28 | 0.32 | 1.9 |
| 14D | 28 | 0.23 | 1.8 |

Table 5 illustrates that all of the samples have cadmium and lead concentrations well beneath the EPA maximum concentrations of 1 mg/l cadmium and 5 mg/l lead, and that no substantial increases in concentrations occurred in the leachate of samples cured for longer time periods. This indicates that the soil cement specimens formed by the new process would not pose an environmental threat over longer periods of time.

Thus, a preferred embodiment of the soil cement composition can be produced by forming an ash aggregate from a mixture of about 1 to 50 percent municipal solid waste incinerator ash and from 50 to 99 percent aggregate material; After sifting the ash aggregate so that it has a particle size of less than three eighths ($\frac{3}{8}$") inch. The ash aggregrate too large to pass through an ASTM $\frac{3}{8}$" mesh screen is crushed and sifted through an ASTM $\frac{3}{8}$" mesh screen. Particles passing through the ASTM $\frac{3}{8}$" mesh screen are then combined with the previously sifted ash aggregrate having a particle size small enough to pass through an ASTM $\frac{3}{8}$" mesh screen. The ash aggregate is combined with from 1 to 9 percent cement and compacted in place. After seven days, a stable solid with sufficient compressive strength to be used as a road base is formed.

In another preferred embodiment, the soil cement ash aggregate comprises 75 percent sand/shell aggregate material combined with 25 percent municipal solid waste incinerator ash; the ash aggregate mixture has a particle size sufficiently small to pass through an ASTM No. 4 mesh screen, and has a moisture content between one and thirteen percent. The ash aggregate is combined with at least five percent portland cement, with the resulting combination having a moisture content between eight and twelve percent. The combination is then compacted to form a soil cement road base having an unconfined compressive strength in excess of 300 pounds per square inch after curing for seven days.

It is desirable to use as small a quantity as possible of cement due to its expense. FIG. 2 demonstrates that soil cement containing municipal solid waste incinerator ash has a higher compressive strength than soil cement formed from an aggregate material which does not contain incinerator ash and which has an equal amount of cement added to it. Therefore, soil cement compositions formed by the present process are actually stronger than soil cements formed without incinerator ash; this means that less cement can be used in roads constructed with bases made with MSWIA which results in a corresponding decrease in cost.

The environmental test results in TABLE 2, 3, 4 and 5 show that, provided an ash aggregate is used which contains less than 50 percent MSWIA and/or contains sufficient cement, the toxic metals in MSWIA are immobilized in the soil cement matrix and will not be leached out in concentrations which exceed ERA toxicity limits. Thus, a further benefit of the present invention is the potential elimination of a potentially hazardous waste disposal problem by combining municipal solid waste incinerator ash in compositions which can be used in the construction of roads, parking lots and other areas. This avoids the cost of dumping the incinerator ash into land fills where it can pose an environmental hazard. Presently, many municipal solid waste incinerator facilities pay for the disposal of incinerator ash; it is envisioned that the present invention may one day make it possible for municipal solid waste incinerator facilities to utilize the ash produced, and at the same time, decrease the cost of road construction.

Although preferred embodiments of a process for producing new and improved soil cement compositions has been described and illustrated herein, it will be understood that various alterations, modifications and substitutions may be apparent to one of skill in the art without departing from the essential spirit of the invention. The scope of the invention is accordingly defined by the following claims.

We claim:

1. A process for the production of a composition suitable as a base for surfaces such as roads and parking lots, comprising the steps of:
   (a) mixing incinerator ash with an aggregate material to form a first stream of ash aggregate, said incinerator ash being selected from the group comprising bottom ash, fly ash, and bottom ash mixed with fly ash;
   (b) sifting said first stream of said ash aggregate to form a second stream of said ash aggregate having a particle size less than $\frac{3}{8}$" and a third stream of said ash aggregate having a particle size greater than $\frac{3}{8}$";
   (c) combining said ash aggregate from said second stream with a cementitious material, said cementitious material being present in an amount sufficient to form a stable solid, said solid yielding an aqueous leachate containing less than 1.0 ppm Cd, 5.0 ppm Pb, 5.0 ppm Ag, 5.0 ppm As, 100.0 ppm Ba, 5.0 ppm Cr, 0.2 ppm Hg and 1.0 ppm Se when subjected to an EPA toxicity procedure.

2. A process according to 1, wherein step (b) further comprises the steps of:

(1) crushing said third stream;
(2) following step (1), sifting said third stream to form a fourth stream having a particle size less than $\frac{3}{8}''$ and a fifth stream having a particle size greater than $\frac{3}{8}''$;
(3) following step (2), mixing said fourth stream into said second stream.

3. A process according to claim 1, wherein said first stream is sifted in step (b) to form a second stream having a particle size sufficiently small to pass through an ASTM #4 mesh and a third stream having a particle size sufficiently large to prevent passage through an ASTM #4 mesh.

4. A process according to claim 2, wherein:
said first stream is sifted in step (b) to form a second stream having a particle size sufficiently small to pass through an ASTM #4 mesh and a third stream having a particle size sufficiently large to prevent passage through an ASTM #4 mesh; and
said third stream is sifted after said crushing step to form a fourth stream having a particle size sufficiently small to pass through an ASTM #4 mesh, and a fifth stream having a particle size sufficiently large to prevent passage through an ASTM #4 mesh.

5. A process according to claim 1, further comprising the step of magnetically removing ferrous metals from said incinerator ash.

6. A process according to claim 1, wherein step (a) further comprises the steps of:
(1) regulating the amount of said incinerator ash combined with said aggregate material, wherein said ash aggregate in said first stream comprises between 10% and 25% of said incinerator ash, and between 75% and 90% of said aggregate material 7. A process according to claim 6, wherein said cementitious material comprises portland cement, and step (c) further comprises the step of:
regulating the amount of said ash aggregate combined with said cementitious material; and
adjusting the moisture content of said combination so said combination comprises between 1 and 13% moisture.

8. A process according to claim 5, further comprising the steps of:
applying said combination to a surface;
compressing said combination; and
aging said combination until a stable solid forms.

9. A volumetrically stable solid suitable for use as a base for surfaces such as roads and parking lots produced in accordance with the process of claim 1.

10. A volumetrically stable solid suitable for use as a base for surfaces such as roads and parking lots produced in accordance with the process of claim 4.

11. A process for the production of a composition, comprising the steps of:
mixing incinerator ash with an aggregate material to form an ash aggregate mixture, said incinerator ash being selected from the group comprised of bottom ash and fly ash; and
combining said ash aggregate mixture with a cementitious material, said ash aggregate mixture having a particle size sufficiently small and said cementitious material being present in a sufficiently large amount to form a stable solid.

12. A composition produced by the process of claim 11.

* * * * *